(12) United States Patent  (10) Patent No.: US 8,213,988 B2
Kon et al.  (45) Date of Patent: Jul. 3, 2012

(54) METHOD AND APPARATUS FOR MANAGING DATA USING A SIM CARD

(75) Inventors: Takayasu Kon, Tokyo (JP); Miki Abe, Kanagawa (JP); Yoichiro Sako, Tokyo (JP); Yasunori Kamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 402 days.

(21) Appl. No.: 12/247,465

(22) Filed: Oct. 8, 2008

(65) Prior Publication Data

US 2009/0111523 A1 Apr. 30, 2009

(30) Foreign Application Priority Data

Oct. 29, 2007 (JP) ................. 2007-280885

(51) Int. Cl.
*H04B 1/38* (2006.01)
(52) U.S. Cl. ......... 455/558; 455/411; 455/415; 235/380
(58) Field of Classification Search .................. 455/558, 455/414.2, 432.3, 432.2
See application file for complete search history.

(56) References Cited

U.S. PATENT DOCUMENTS

2005/0009564 A1* 1/2005 Hayaashi et al. ............. 455/558

FOREIGN PATENT DOCUMENTS

| JP | 2000-196708 A | 7/2000 |
| JP | 2001-223631 A | 8/2001 |
| JP | 2004-146910 A | 5/2004 |

* cited by examiner

*Primary Examiner* — Kamran Afshar
*Assistant Examiner* — Kenneth Corbin
(74) *Attorney, Agent, or Firm* — Wolf, Greenfield & Sacks, P.C.

(57) ABSTRACT

An information processing apparatus including an IC chip receiving, by communicating with a reader/writer, service data corresponding to a service provided via the reader/writer and processing the received service data, a SIM card holding section holding a SIM card which includes a card internal memory storing information and to which a unique number for identifying a subscriber is added and a control section storing in the card internal memory of the SIM card the service data processed by the IC chip in the communication with the reader/writer, reading the service data stored in the card internal memory of the SIM card and making the IC chip process the service data.

9 Claims, 8 Drawing Sheets

METHOD AND APPARATUS FOR MANAGING DATA USING A SIM CARD

CROSS REFERENCES TO RELATED APPLICATIONS

The present invention contains subject matter related to Japanese Patent Application JP 2007-280885 filed in the Japan Patent Office on Oct. 29, 2007, the entire contents of which being incorporated herein by reference.

BACKGROUND OF THE INVENTION

1. Field of the Invention

The present invention relates to an information processing apparatus and an information processing method.

2. Description of the Related Art

In recent years, information processing apparatuses such as a non-contact type IC (Integrated Circuit) card and a mobile phone with a non-contact type IC chip, capable of communicating with a reader/writer (or a device having a read/write function; hereinafter referred to as a "reader/writer") in a non-contact manner has become widespread.

By including a tamper-resistant IC chip, the information processing apparatus as described above capable of communicating with a reader/writer in a non-contact manner can safely send/receive or update data, the alteration of which may become a problem, such as electronic money. Accordingly, various services are becoming socially widespread that use the information processing apparatus as described above with a non-contact type IC chip and that is capable of communicating with a reader/writer in a non-contact manner. Also, along with the spread of the provision of the services, information processing apparatuses such as a non-contact type IC (Integrated Circuit) card and a mobile phone with a non-contact type IC chip are becoming more widespread.

Under such circumstance, a technology relating to communication by an information processing apparatus capable of communicating with a reader/writer in a non-contact manner is being developed. For example, JP2004-146910A discloses a technology of switching between multiple communication methods so as not to affect the receiver sensitivity of the mobile phone function at the time of communication with a reader/writer.

SUMMARY OF THE INVENTION

As the information processing apparatus such as a mobile phone with a non-contact type IC chip becomes widespread, users are changing the information processing apparatus more frequently by, for example, changing the model of a mobile phone. Service has emerged that transfers, at the time of changing the model of the mobile phone (or at the time of failure of a mobile phone), the data on the IC chip (source IC chip) in the mobile phone before the change to the IC chip (destination IC chip) in the mobile phone after the change.

However, an IC chip has a memory area the access to which is restricted in order to prevent the alteration of data, and data corresponding to a service (hereinafter referred to as "service data") provided via a reader/writer (or a device having a reader/writer function) may be stored in such memory area. Thus, it is not easy to transfer data from the source IC chip to the destination IC chip.

Further, the transfer of data from the source IC chip to the destination IC chip is not limited to transfer of all the data on the source IC chip to the destination IC chip, and there may be a case where a part of the data on the source IC chip is not transferred to the destination IC chip. As a case where a part of the data on the source IC chip is not transferred to the destination IC chip, there is a case where additional information inhibiting the transfer of data is added to the data on the source IC chip.

Accordingly, in the related art, when transferring data from the source IC chip to the destination IC chip, not only is it burdensome to transfer the data, but also, there may be a case where data which is stored in the IC chip of an information processing apparatus after the model change (destination IC chip) and data which was stored in the IC chip of the information processing apparatus before the model change (source IC chip) do not match. Thus, even if the data is transferred, a user of an information processing apparatus such as a mobile phone with a non-contact type IC chip may not be able to receive the same service with the information processing apparatus to which the data is transferred as with the information processing apparatus that previously held the data. In the related art relating to communication of an information processing apparatus capable of communicating with a reader/writer in a non-contact manner, the problems as described above are not taken into consideration.

The present invention is provided in view of the above-described issues, and it is desirable to provide a new and improved information processing apparatus capable of easily transferring service data stored in an information processing apparatus to another information processing apparatus.

According to an embodiment of the present invention, there is provided an information processing apparatus including an IC chip receiving, by communicating with a reader/writer, service data corresponding to a service provided via the reader/writer and processing the received service data; a SIM card holding section holding a SIM card which includes a card internal memory storing information and to which a unique number for identifying a subscriber is added; and a control section storing in the card internal memory of the SIM card the service data processed by the IC chip in the communication with the reader/writer, reading the service data stored in the card internal memory of the SIM card and making the IC chip process the service data.

According to another embodiment of the present invention, there is provided an information processing apparatus including an IC chip receiving from a reader/writer, by communicating with the reader/writer, service data corresponding to a service provided via the reader/writer; a SIM card holding section holding a SIM card which includes a card internal memory storing information and to which a unique number for identifying a subscriber is added; and a control section forwarding the service data received by the IC chip in the communication with the reader/writer to the SIM card held in the SIM card holding section, making the SIM card process the service data, making the SIM card store the processed service data in the card internal memory of the SIM card, reading the service data stored in the card internal memory of the SIM card and making the IC chip send the service data.

According to another embodiment of the present invention, there is provided an information processing apparatus including a SIM card holding section holding a SIM card which receives from a reader/writer, by communicating with the reader/writer, service data corresponding to a service provided via the reader/writer, processes the received service data, includes a card internal memory storing the processed service data and to which a unique number for identifying a subscriber is added; and a control section making the SIM card store in the card internal memory of the SIM card the service data processed by the SIM card in the communication with the reader/writer, reading the service data stored in the card internal memory of the SIM card and making the SIM card send the service data to the reader/writer.

With such configuration, a SIM card can be made to store service data, and the service data stored in an information processing apparatus can be easily transferred to another information processing apparatus.

According to the embodiments of the present invention, service data stored in an information processing apparatus can be easily transferred to another information processing apparatus.

DETAILED DESCRIPTION OF THE PREFERRED EMBODIMENTS

Figure 1:
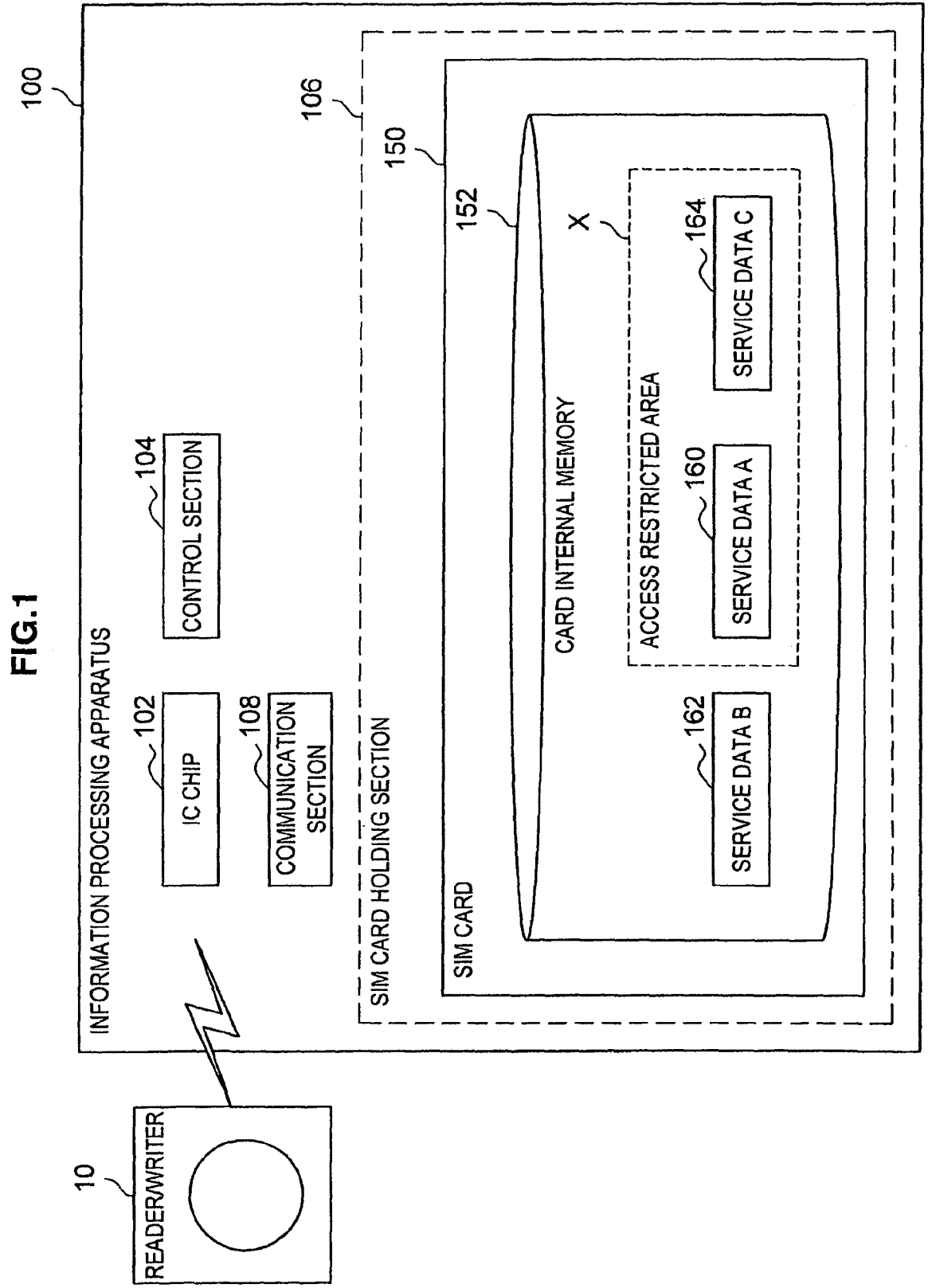
FIG. 1 is a block diagram showing an information processing apparatus according to a first embodiment of the present invention.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

(Approach of the Embodiment of the Present Invention)

Before describing an information processing apparatus according to the embodiment of the present invention, the approach of the information processing apparatus according to the embodiment of the present invention for problem solving will be described.

The information processing apparatus according to the embodiment of the present invention focuses on an IC card (or an IC chip) in which a unique ID number is stored for identifying a subscriber for a mobile phone, that is, a SIM (Subscriber Identity Module Card), and processes and transfers service data in a manner described hereunder.

(1) Storing of Service Data

The information processing apparatus according to the embodiment of the present invention stores in the SIM card the service data processed by the process relating to a service (hereinafter referred to as "service processing") provided via a reader/writer. Further, the information processing apparatus according to the embodiment of the present invention reads the service data stored in the SIM card as needed and performs the service processing thereon. Incidentally, according to the information processing apparatus according to the embodiment of the present invention, data that is stored in and read from the SIM card is not limited to the service data and various data such as an application program, image data and music data may be stored in the SIM card and may be read as needed.

(2) Transfer of Data

The SIM card is an IC card which can be inserted into and removed from an information processing apparatus, and by inserting the SIM card removed from an information processing apparatus into another information processing apparatus, the SIM card operates in the other information processing apparatus. Accordingly, with the information processing apparatus according to the embodiment of the present invention storing service data in the SIM card, with the insertion/removal of the SIM card, the service data can be transferred to another information processing apparatus.

Here, with the information processing apparatus according to the embodiment of the present invention, the SIM card itself in which the service data is stored can be physically transferred to another information processing apparatus. Accordingly, data can be easily transferred compared to the data transfer method of the related art, and also, a case does not arise where a part of data in the source IC chip is not transferred to the destination IC chip.

As described above, by storing service data in a SIM card, the information processing apparatus according to the embodiment of the present invention can easily transfer the data to another information processing apparatus. In the following, the information processing apparatus according to the embodiment of the present invention will be described more concretely.

(First Embodiment)

FIG. 1 is a block diagram showing an information processing apparatus 100 according to a first embodiment of the present invention. FIG. 1 shows an IC chip 102 (described later) provided in the information processing apparatus 100 and a reader/writer 10 that performs communication relating to a service. Incidentally, although the IC chip 102 of the information processing apparatus 100 and the reader/writer 10 can communicate with each other in a non-contact manner by using a magnetic field of 13.56 MHz (hereinafter referred to as a "carrier"), for example, it is not restricted to such configuration, and they can communicate with each other in a contact manner. In the following, as an example of the embodiment of the presenting invention, a configuration is described in which the IC chip 102 of the information processing apparatus 100 and the reader/writer 10 communicate with each other in a non-contact manner by using a carrier.

Referring to FIG. 1, the information processing apparatus 100 according to the first embodiment includes an IC chip 102, a control section 104, a SIM card holding section 106 and a communication section 108.

The information processing apparatus 100 can contain within itself a SIM card 150 including a card internal memory 152 capable of storing service data. Here, a unique number called an IMSI (International Mobile Subscriber Identity) that is used for the identifying a subscriber is added to the SIM card 150, and the information processing apparatus 100 can uniquely identify the SIM card 150. Further, the card internal memory 152 of the SIM card 150 can include an access restricted area X. Here, the access restricted area X is a storage area wherein an access restriction requiring an authentication with an encryption key, for example, may be set (or released) when performing read process or write process for the service data stored in the access restricted area X. FIG. 1 shows an example where service data A 160, service data B 162 and service data C 164 are stored in the card internal memory 152, and among the data, the service data A 160 and the service data C 164 are stored in the access restricted area X.

Further, the information processing apparatus 100 may include a ROM (Read Only Memory; not shown) storing programs to be used by the control section 104 and data for control such as computational parameters, a RAM (Random Access Memory; not shown) temporarily storing programs and the like to be executed by the control section 104, an operation section (not shown) which can be operated by a user, a display section (not shown), a storage section (not shown) and the like. The information processing apparatus 100 can connect each component with a bus as a transmission path for data, for example.

Here, the operation section (not shown) may be, for example, an operation input device such as a keyboard, a mouse and the like, a button, a direction key, a rotary selector such as a jog dial, or a combination thereof, but it is not limited to such. Further, the display section (not shown) may be, for example, an LCD (Liquid Crystal Display) or an organic EL display (organic ElectroLuminescence display, also called as an OLED display (Organic Light Emitting Diode display)), but it is not limited to such. Note than, the operation section (not shown) and the display section (not shown) can be an integrated part configured from a touch screen, for example.

Further, the storage section (not shown) may be, for example, a magnetic recording medium, such as a hard disk, or a non-volatile memory such as an EEPROM (Electronically Erasable and Programmable Read Only Memory), a flash memory, an MRAM (Magnetoresistive Random Access Memory), a FeRAM (Ferroelectric Random Access Memory) and a PRAM (Phase change Random Access Memory), but it is not limited to such.

(Hardware Configuration Example of Information Processing Apparatus 100)

Figure 2:
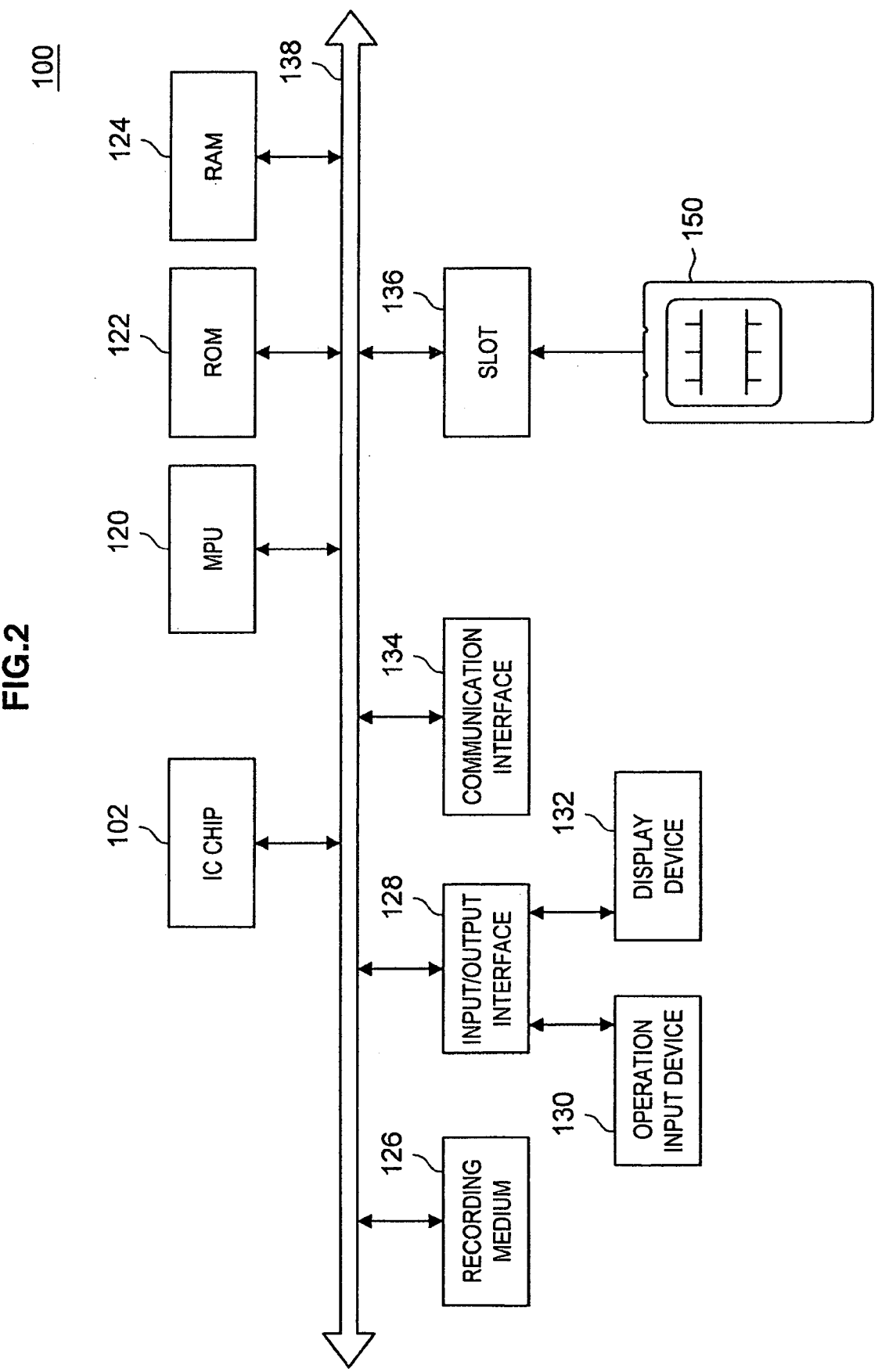
FIG. 2 is an explanatory diagram showing an example of the hardware configuration of the information processing apparatus according to the first embodiment of the present invention.

FIG. 2 is an explanatory diagram showing an example of the hardware configuration of the information processing apparatus 100 according to the first embodiment of the present invention. Referring to FIG. 2, the information processing apparatus 100 includes an IC chip 102, an MPU 120, a ROM 122, a RAM 124, a recording medium 126, an input/output interface 128, an operation input device 130, a display device 132, a communication interface 134 and a slot 136. Further, the information processing apparatus 100 connects each component with a bus 138 as a transmission path for data, for example.

The IC chip 102 is a chip on which various parts relating to the communication with the reader/writer 10 are integrated, and can be tamper resistant. Further, the IC chip 102 performs various data processing (for example, service processing) in response to a command from outside of the IC chip 102 such as various commands from the reader/writer 10 or a command from a component (for example, control section 104) in the information processing apparatus 100 other than the IC chip 102. Incidentally, the hardware configuration of the IC chip 102 will be described later.

The MPU 120 functions as the control section 104 described later. The ROM 122 stores programs to be used by the MPU 120 and data for control such as computational parameters. The RAM 124 temporarily stores programs and the like to be executed by the MPU 120. The recording medium 126 functions as the storage section (not shown) of the information processing apparatus 100, and can store application and data to be used in the information processing apparatus 100, for example.

The input/output interface 128 can connect, for example, the operation input device 130 and the display device 132 to the information processing apparatus 100. Here, the input/output interface 128 may be, for example, a USB terminal, a DVI (Digital Visual Interface) terminal or an HDMI (High-Definition Multimedia Interface) terminal, but it is not limited to such. Further, the operation input device 130 may be, for example, a button, a direction key, a rotary selector such as a jog dial, or a combination thereof, but it is not limited to such. The operation input device 130 is provided on the information processing apparatus 100 and is connected with the input/output interface 128 within the information processing apparatus 100. Further, the display device 132 may be, for example, an LCD (Liquid Crystal Display) or an organic EL display (organic ElectroLuminescence display, also called as an OLED display (Organic Light Emitting Diode display)), but it is not limited to such. The display device 132 is provided on the information processing apparatus 100 and is connected with the input/output interface 128 within the information processing apparatus 100. Incidentally, it is needless to say that the input/output interface 128 can be connected to an operation input device as external unit (for example, a keyboard or a mouse) or a display device as external unit (for example, an external display) of the information processing apparatus 100.

The communication interface 134 is an interface for communicating with an external unit and can function as the communication section 108. Here, the communication interface may be an RF (Radio Frequency) circuit having a radio communication antenna for communicating with a base station, a LAN (Local Area Network) terminal, an infrared port or an IEEE 802.11 port, but it is not limited to such.

The slot 136 functions as the SIM card holding section 106 holding the SIM card 150 in an attachable/detachable manner. Further, the slot 136 connects the information processing apparatus 100 and the SIM card 150 enabling the data transfer between each other.

With the hardware configuration as shown in FIG. 2, the information processing apparatus 100 can store in the SIM card service data processed by the IC chip 102 in the service processing relating to the communication with the reader/writer 10.

Referring again to FIG. 1, each component of the information processing apparatus 100 will be described. As has been described with reference to FIG. 2, the IC chip 102 performs the service processing in response to various commands from the reader/writer 10 or a command from the control section 104.

The control section 104 receives the service data processed by the IC chip 102 and stores the service data in the card internal memory 152 of the SIM card 150 held in the SIM card holding section 106. Further, the control section 104 can also store the service data in the access restricted area X of the card internal memory 152 depending on the attribute of the service data received from the IC card. Here, information such as an encryption key for accessing the access restricted area X of the card internal memory 152 can be stored in a storage means provided in the control section 104, for example. Here, the storage means provided in the control section 104 may be, for example, a non-volatile memory such as an EEPROM, but it is not limited to such. Incidentally, the information such as an encryption key can be stored in, for example, the ROM 122, the RAM 124 or the recording medium 126 shown in FIG. 2 and be read by the control section 104 as needed.

Further, the control section 104 can read the service data stored in the card internal memory 152 of the SIM card 150, forward the service data to the IC chip 102 and make the IC chip 102 process the service data.

Incidentally, the control section 104 can also, depending on the IMSI (unique number) added to the SIM card 150 held in the SIM card holding section 106, restrict the writing and/or reading of service data (that is, perform a so-called "negative check"). Here, the information to be used for restricting the writing and/or reading of the service data can be stored in the storage section (not shown) in a database format, but it is needless to say that it is not limited to such. Further, the information to be used for restricting the writing and/or reading of the service data can be added or deleted by the control section 104 by inputting the information from the operation section (not shown) or forwarding the information from the external unit via the communication section 108.

As described above, by including the control section 104, the information processing apparatus 100 can store the service data in the SIM card 150, and also, make the IC chip 102 process the service data stored in the SIM card 150. Accordingly, the information processing apparatus 100 can make the reader/writer 10 performing the service processing between itself and the IC chip 102 recognize the information processing apparatus 100 as an apparatus that performs the service processing in the same manner as the information processing apparatus of the related art having an IC chip. Thus, the reader/writer 10 communicating with the information processing apparatus 100 does not need to implement new function to communicate with the information processing apparatus 100.

The communication section 108 communicates with an external unit such as a mobile phone or a personal computer (PC) via a base station, for example. Further, in the communication, the communication section 108 can also send a number unique to the information processing apparatus 100 called IMEI (International Mobile Equipment Identity) (stored in a ROM (not shown) provided in the information processing apparatus 100, for example) and the IMSI of the SIM card 150 held in the SIM card holding section 106.

(Example of Hardware Configurations of IC Chip 102 and SIM Card 150 According to First Embodiment)

Next, an example of the hardware configurations of the IC chip 102 and the SIM card 150 according to the first embodiment will be described to make it clearer as to how the service data processed by the IC chip 102 is stored in a SIM card.

Figure 3:
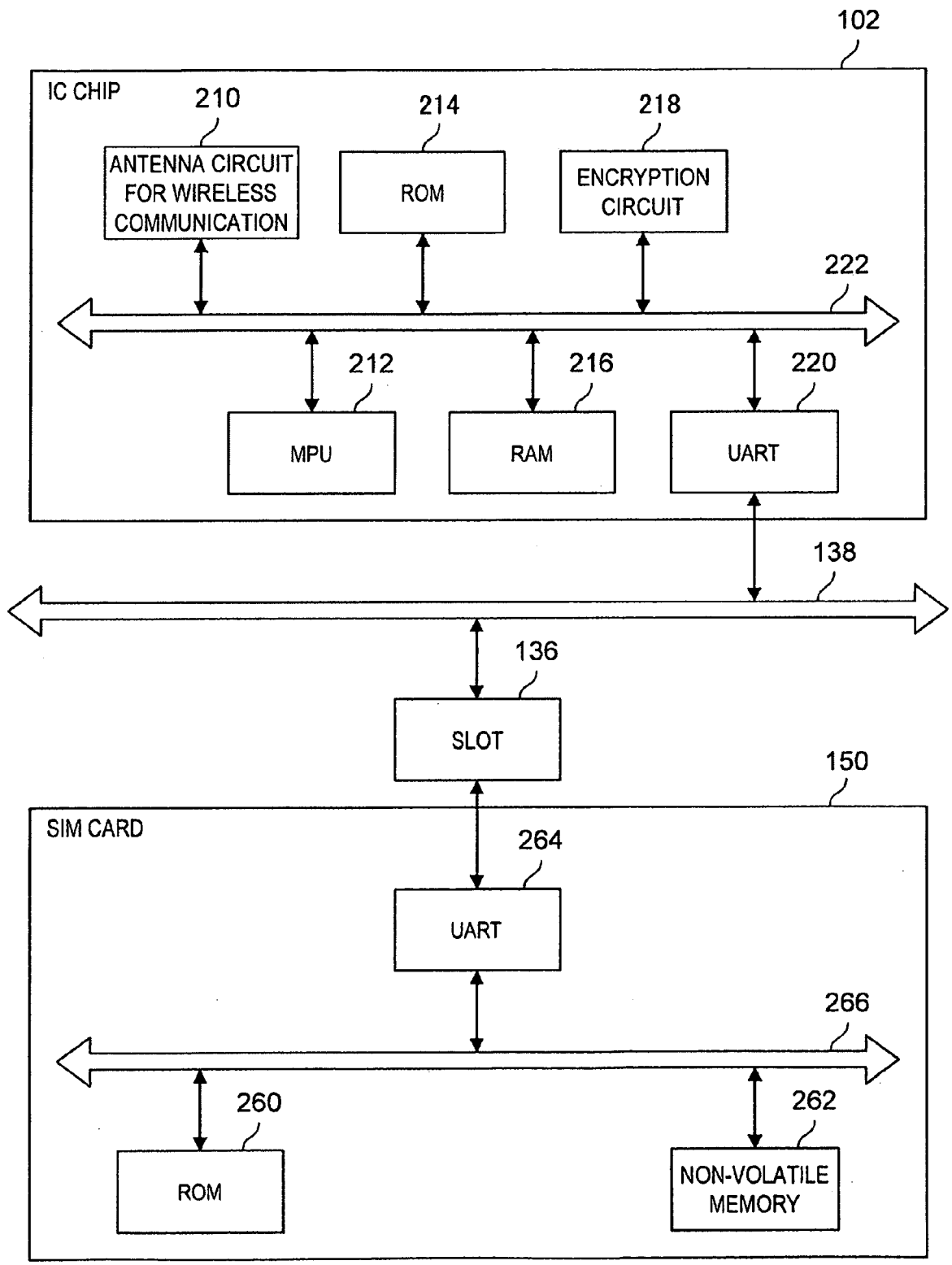
FIG. 3 is an explanatory showing an example of the hardware configuration of an IC chip and a SIM card according to the first embodiment of the present invention.

FIG. 3 is an explanatory showing the example of the hardware configuration of the IC chip 102 and the SIM card 150 according to the first embodiment of the present invention. Note that, in FIG. 3, although the control section 104 is not shown, writing (storing) of the service data into the SIM card 150, reading of the service data from the SIM card 150 and forwarding of the service data to the IC chip 102 are performed by the control section 104.

(IC Chip 102)

The IC chip 102 includes an antenna circuit for wireless communication 210, an MPU 212, a ROM 214, a RAM 216, an encryption circuit 218 and a UART (Universal Asynchronous Receiver Transmitter) 220, and each component is connected by a chip-internal bus 222. Further, the IC chip 102 is connected with the bus 138 outside the IC chip 102 via the UART 220 serving as an interface between the IC chip 102 and a component outside the IC chip 102.

The antenna circuit for wireless communication 210 is configured with, for example, a resonant circuit having a coil as a transmitting/receiving antenna with predetermined inductance and a capacitor with predetermined capacitance and a demodulator circuit, and receives a carrier sent from the reader/writer 10 and demodulates the various commands or the service data. Further, the antenna circuit for wireless communication 210 includes a load modulation circuit and performs load modulation, for example, and communicates with the reader/writer 10 over the carrier by changing the impedance of the IC chip 102 to the reader/writer 10. Note that, in FIG. 3, a configuration is shown in which the antenna circuit for wireless communication 210 is provided inside the IC chip 102. However, the configuration of the IC chip 102 according to the first embodiment of the present invention is not limited to such. For example, the IC chip 102 according to the first embodiment of the present invention can have the transmitting/receiving antenna provided outside the IC chip 102 or can have the transmitting/receiving antenna and the IC chip 102 provided in one package.

The MPU 212 performs the service processing in response to the various commands demodulated by the antenna circuit for wireless communication 210. Then, the MPU 212 makes the encryption circuit 218 encrypt the processed service data and forwards the service data to the bus 138 outside the IC chip 102 via the UART 220.

The ROM 214 can store the programs to be used by the MPU 212 and data for control such as computational parameters. Further, the RAM 216 can temporarily store the programs to be executed by the MPU 212 and the like. Further, the encryption circuit 218 stores the encryption key, for example, and encrypts data such as the service data by using the encryption key.

The IC chip 102 can, with the configuration as shown in FIG. 3, for example, forward the processed service data to the control section 104 outside the IC chip 102.

(SIM Card 150)

The SIM card 150 includes a ROM 260, a non-volatile memory 262 and a UART 264, and each component is connected by a card internal bus 266. Further, the SIM card 150 is connected with the slot 136 (SIM card holding section 106) of the information processing apparatus 100 via the UART 264 serving as an interface between the SIM card 150 and an external unit of the SIM card 150.

The ROM 260 stores the IMSI which is a unique number for uniquely identifying the SIM card 150. The non-volatile memory 262 functions as the card internal memory 152 and can store the service data.

The SIM card 150 can, with the configuration as shown in FIG. 3, for example, store data such as the service data. Further, the stored data such as the service data is written in the SIM card 150 by the control section 104 of the information processing apparatus 100 and read by the control section 104 of the information processing apparatus 100.

(Method of Writing Data According to First Embodiment)

Figure 4:
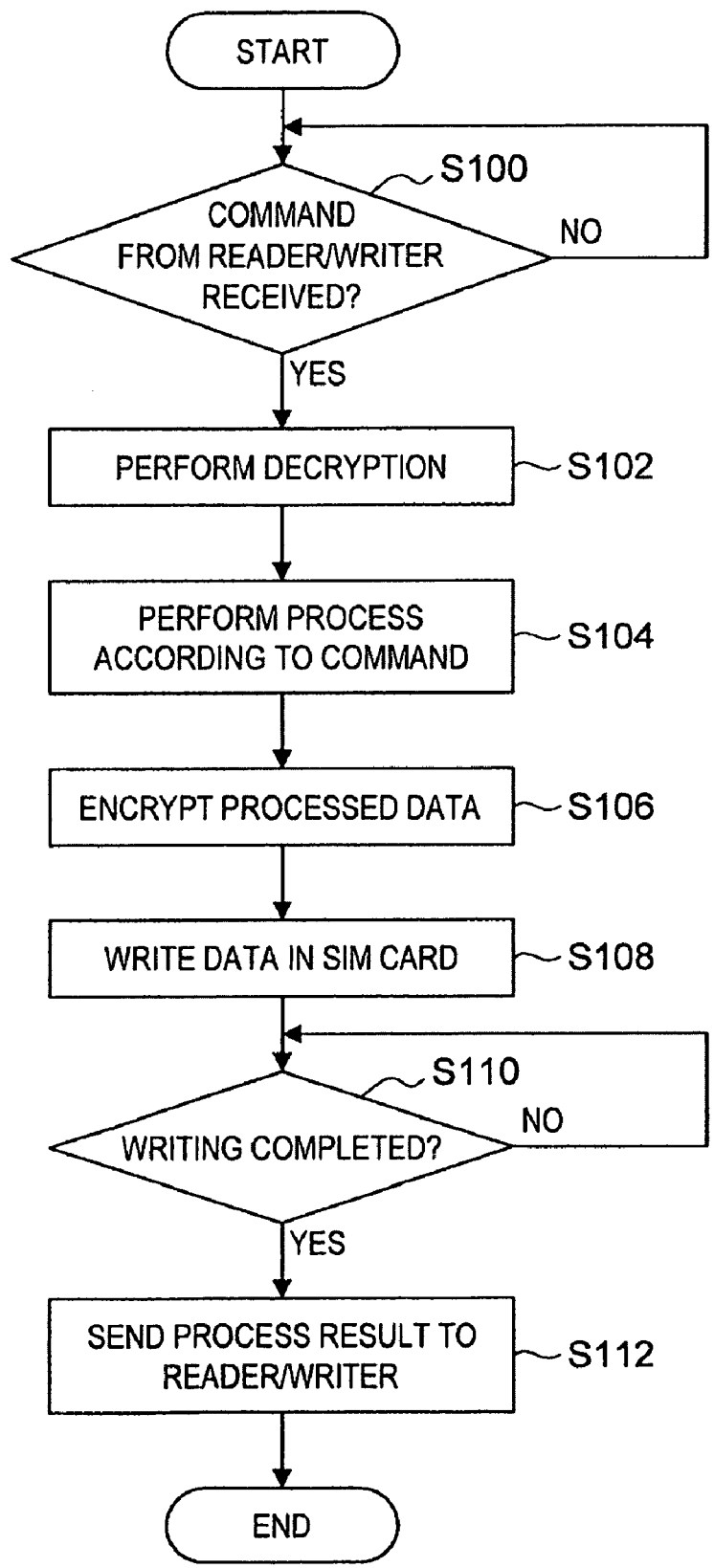
FIG. 4 is a flow chart showing an example of a method of writing data according to the first embodiment of the present invention.

Next, a method of writing data according to the first embodiment of the present invention will be described. FIG. 4 is a flow chart showing an example of the method of writing data according to the first embodiment of the present invention.

The information processing apparatus 100 judges whether or not a command is received from the reader/writer 10 (S100). The information processing apparatus 100 can perform the judgment of step S100 based on whether voltage is excited at the communication antenna of the IC chip 102 or not.

When it is not judged in step S100 that a command is received from the reader/writer 10, the information processing apparatus 100 does not proceed with the process until a command is received from the reader/writer 10.

Further, when it is judged in step S100 that a command is received from the reader/writer 10, the information processing apparatus 100 decrypts the command from the reader/writer 10 (S102). Incidentally, information to be decrypted in step S102 are not limited to the various commands such as a write command and a read command sent from the reader/writer 10 and can include data such as the service data.

When the decryption is performed in step S102, the information processing apparatus 100 performs a process (service processing) corresponding to the command (S104). Then, the information processing apparatus 100 encrypts the data processed in step S104 (S106). It should be noted here that the processes of steps S100 to S106 are performed by the IC chip 102 of the information processing apparatus 100, for example.

Incidentally, the data to be processed in step S104 is not limited to the data decrypted in step S102 (data sent from the reader/writer 10). For example, the data to be processed in step S104 may be data read by the control section 104, in response to the read command from the reader/writer 10, from the SIM card 150 held in the SIM card holding section 106 and forwarded to the IC chip 102.

When the processed data is encrypted in step S106, the information processing apparatus 100 writes the data in the card internal memory 152 of the SIM card held in the SIM card holding section 106 (S108). Then, the information processing apparatus 100 judges whether or not the writing in step S108 is completed (S110). Here, the judgment of step S110 can be performed based on whether or not the write transaction is normally completed, for example. Further, the processes of steps S108 and S110 is performed by the control section 104 of the information processing apparatus 100, for example.

When it is not judged in step S110 that the writing is completed, the information processing apparatus 100 does not proceed with the process.

Further, when it is judged in step S110 that the writing is completed, the information processing apparatus 100 sends the process result to the reader/writer 10 (S112). Here, in the information processing apparatus 100, the process of step S112 is performed by the control section 104 making the IC chip 102 send the process result.

By using the method of writing data as shown in FIG. 4, the information processing apparatus 100 can make the SIM card 150 held in the SIM card holding section 106 store the service data in itself.

(Method of Reading Data According to First Embodiment)

Incidentally, although FIG. 4 shows the method of writing data according to the first embodiment of the present invention, a method of reading data according to the first embodiment may be performed in response to a command sent from the reader/writer 10 in the same manner. Specifically, the method of reading data according to the first embodiment can be realized by combining steps S100 to S104 and step 112 of FIG. 4, for example. That is, the information processing apparatus 100 reads data from the SIM card 150 in response to a command from the reader/writer 10 and sends the process result to the reader/writer 10. Note that, when a read command for data is sent from the reader/writer 10, it is needless to say that the information processing apparatus 100 can send the data read from the SIM card 150 as the process result.

As described above, the information processing apparatus 100 according to the first embodiment of the present invention includes the IC chip 102 that communicates with the reader/writer 10, the SIM card holding section 106 that holds the SIM card 150 and the control section 104 that stores the service data processed by the IC chip 102 in the SIM card 150.

Here, the SIM card 150 is an IC card that can be inserted into and removed from the information processing apparatus 100, and by inserting the SIM card 150 removed from the information processing apparatus 100 into another information processing apparatus, the SIM card 150 operates in the other information processing apparatus. Thus, by making the SIM card 150 store the service data in itself, the information processing apparatus 100 can easily transfer the service data to another information processing apparatus.

Further, the control section 104 provided in the information processing apparatus 100 can read the service data stored in the SIM card 150 and make the IC chip 102 process the service data. Thus, the information processing apparatus 100 can make the reader/writer 10 performing the service processing between itself and the IC chip 102 identify the information processing apparatus 100 as an apparatus that performs the service processing in the same manner as an information processing apparatus of a related art including an IC chip.

Although the information processing apparatus 100 has been described as the first embodiment of the present invention, the embodiment of the present invention is not limited to such embodiment, and it may be applied to a portable communication device such as a mobile phone or a PHS (Personal Handy-phone System) or a computer such as a personal computer with a SIM card.

(Program According to First Embodiment)

With a program which causes the information processing apparatus 100 according to the first embodiment to function as a computer, a SIM card can be made to store service data in itself.

(Second Embodiment)

For the information processing apparatus 100 according to the first embodiment as described above, a configuration is shown where the IC chip 102 performs the service processing and the encryption of data, and the control section 104 stores the processed data in the SIM card 150. However, the information processing apparatus according to the embodiment of the present invention is not limited to such configuration. Thus, an information processing apparatus according to the second embodiment of the present invention will be described next. Note that, although an IC chip provided in the information processing apparatus according to the second embodiment can communicate with the reader/writer 10 in a non-contact manner by using a carrier, it is not limited to such configuration, and the IC chip can also communicate in a contact manner. In the following, as an example of the embodiment of the present invention, a configuration will be described in which the IC chip of the information processing apparatus according to the second embodiment and the reader/writer 10 communicate with each other in a non-contact manner by using a carrier.

The information processing apparatus according to the second embodiment (not shown; hereinafter referred to as an "information processing apparatus 200") can have the same configuration as the information processing apparatus 100 according to the first embodiment as described above, and includes an IC chip 202, a control section 204, a SIM card holding section 106 and a communication section 108. Here, the SIM card holding section 106 and the communication section 108 provided in the information processing apparatus 200 can have the same configurations and functions as those of the information processing apparatus 100 according to the first embodiment. Further, the information processing apparatus 200 has the hardware configuration as shown in FIG. 2, for example, similar to the information processing apparatus 100 according to the first embodiment.

The information processing apparatus 200 can contain within itself a SIM card 250 including a card internal memory 152 capable of storing service data. The configuration and function of the SIM card 250 differ from those of the SIM card 150 contained in the information processing apparatus 100 according to the first embodiment 100. The configuration of the SIM card 250 will be described later.

The IC chip 202 is a chip on which various parts relating to the communication with the reader/writer 10 are integrated, and can be tamper resistant. It should be noted here that whereas the IC chip 102 according to the first embodiment has a configuration for performing the service processing, the IC chip 202 performs not the service processing but the communication with the reader/writer 10 such as demodulation of data or responding by load modulation.

The control section 204 receives service data demodulated by the IC chip 202, forwards the service data to the SIM card 250 held in the SIM card holding section 106 and makes the SIM card 250 store the service data in itself. That is, the control section 204 differs from the control section 104 according to the first embodiment in that the control section 104 according to the first embodiment stores the service data in the SIM card 150, the control section 204 makes the SIM card 250 store the service data in itself.

Further, the control section 204 can read the service data stored in the SIM card 250, forward the service data in the IC chip 202 and make the IC chip send the service data to the reader/writer 10.

In the following, the configuration of the IC chip 202 and the configuration of the SIM card 250 according to the second embodiment will be described.

(Example of Hardware Configurations of IC Chip 202 and SIM Card 250 According to Second Embodiment)

Figure 5:
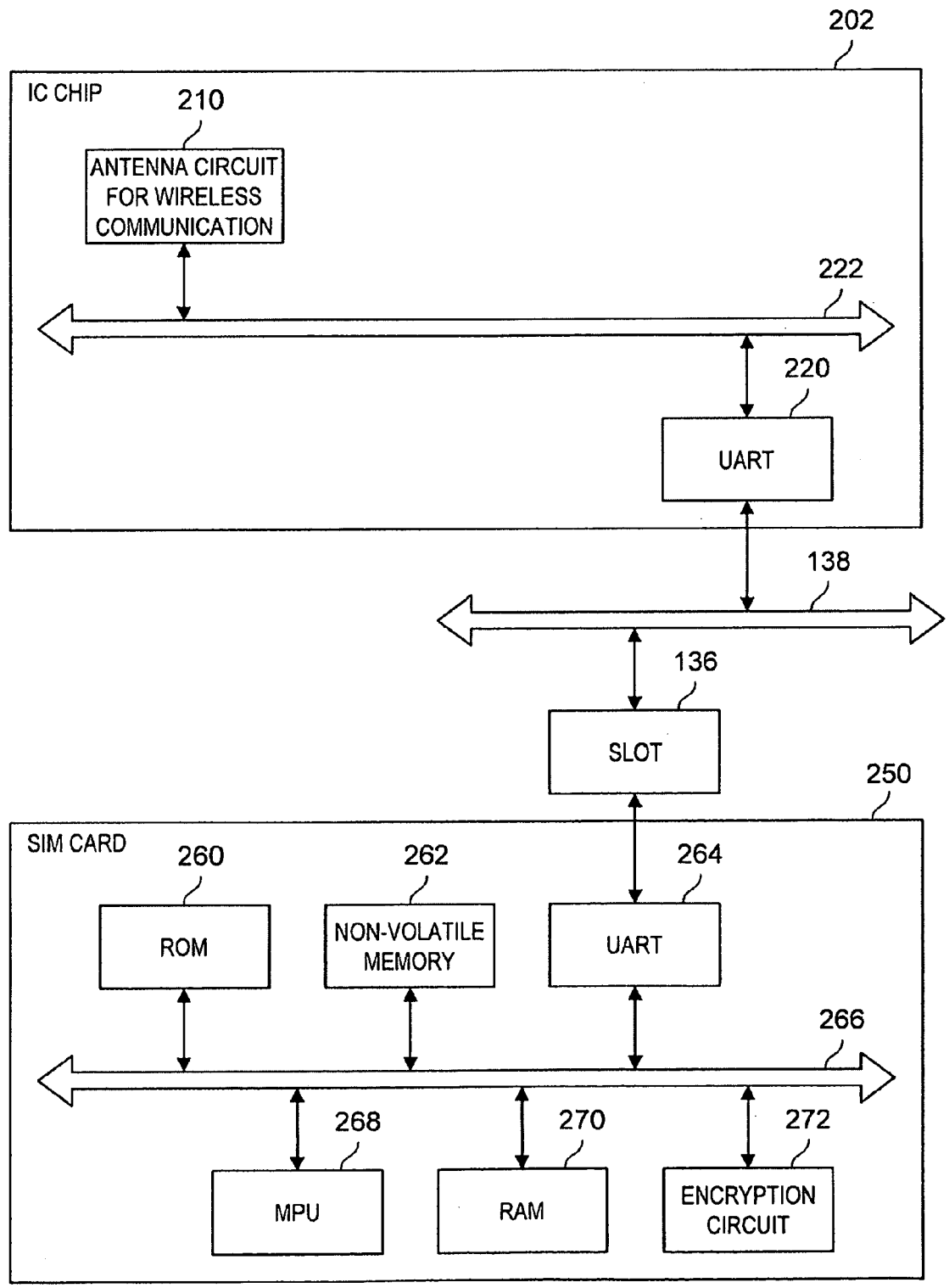
FIG. 5 is an explanatory diagram showing an example of the hardware configurations of an IC chip and a SIM card according to the second embodiment of the present invention.

FIG. 5 is an explanatory diagram showing an example of the hardware configurations of the IC chip 202 and the SIM card 250 according to the second embodiment. Note that, in FIG. 5, although the control section 204 is not shown, storing of the service data in the SIM card 250 is controlled by the control section 204 and reading of the service data in the SIM card 250 and forwarding of the service data to the IC chip 202 are performed by the control section 204 as described above.

(IC Chip 202)

The IC chip 202 includes an antenna circuit for wireless communication 210 and a UART 220, and each component is connected with a chip internal bus 222. Further, the IC chip 202 is connected with a bus 138 outside the IC chip 202 via the UART 220.

The antenna circuit for wireless communication 210 includes, similarly to the antenna circuit for wireless communication 210 according to the first embodiment as shown in FIG. 3, a resonant circuit, a demodulator circuit and a load modulation circuit, for example. Note that, in FIG. 3, a configuration is shown in which the antenna circuit for wireless communication 210 is provided inside the IC chip 202. However, the configuration of the IC chip 202 according to the second embodiment of the present invention is not limited to such. For example, the IC chip 202 according to the second embodiment of the present invention can have a transmitting/receiving antenna configuring the resonant circuit provided outside the IC chip 202 or can have the transmitting/receiving antenna and the IC chip 202 provided in one package.

The IC chip 202 can, with the configuration as shown in FIG. 5, for example, forward the demodulated service data, commands and the like to the control section 204 outside the IC chip 202.

(SIM Card 250)

The SIM card 250 includes a ROM 260, a non-volatile memory 262, a UART 264, an MPU 268, a RAM 270 and an encryption circuit 272, and each component is connected by a card internal bus 266. Further, the SIM card 250 is connected with a slot 136 (SIM card holding section 106) of the information processing apparatus 200 via the UART 264.

The ROM 260, the non-volatile memory 262 and the UART 264 provided in the SIM card 250 can have the same configurations and functions as those of the SIM card 150 according to the first embodiment as shown in FIG. 3. Further, the ROM 260 can store the programs to be used by the MPU 268, data for control such as computational parameters, and the like.

In response to a command from the control section 204 of the information processing apparatus 200, the MPU 268 stores in the non-volatile memory 262 (card internal memory 152) data such as the service data forwarded from the control section 204. Then, when the storing is completed (or the storing fails), the MPU 268 forwards the process result to the control section 204 of the information processing apparatus 200 via the UART 264.

Further, in response to a command from the control section 204 of the information processing apparatus 200, the MPU 268 reads the service data stored in the non-volatile memory 262 (card internal memory 152) and forwards the service data to the control section 204 of the information processing apparatus 200 via the UART 264.

The RAM 270 temporarily stores the programs to be executed by the MPU 268 and the like. Further, the encryption circuit 272 stores an encryption key and encrypts data such as the service data by using the encryption key, for example.

The SIM card 250 can, with the configuration as shown in FIG. 5, for example, store data such as the service data. Further, the stored data such as the service data can be stored in the non-volatile memory 262 (card internal memory 152) by the SIM card 250 in response to a command from the control section 204 of the information processing apparatus 200 and can be read by the SIM card 250 in response to a command from the control section 204 of the information processing apparatus 200.

(Method of Writing Data According to Second Embodiment)

Figure 6:
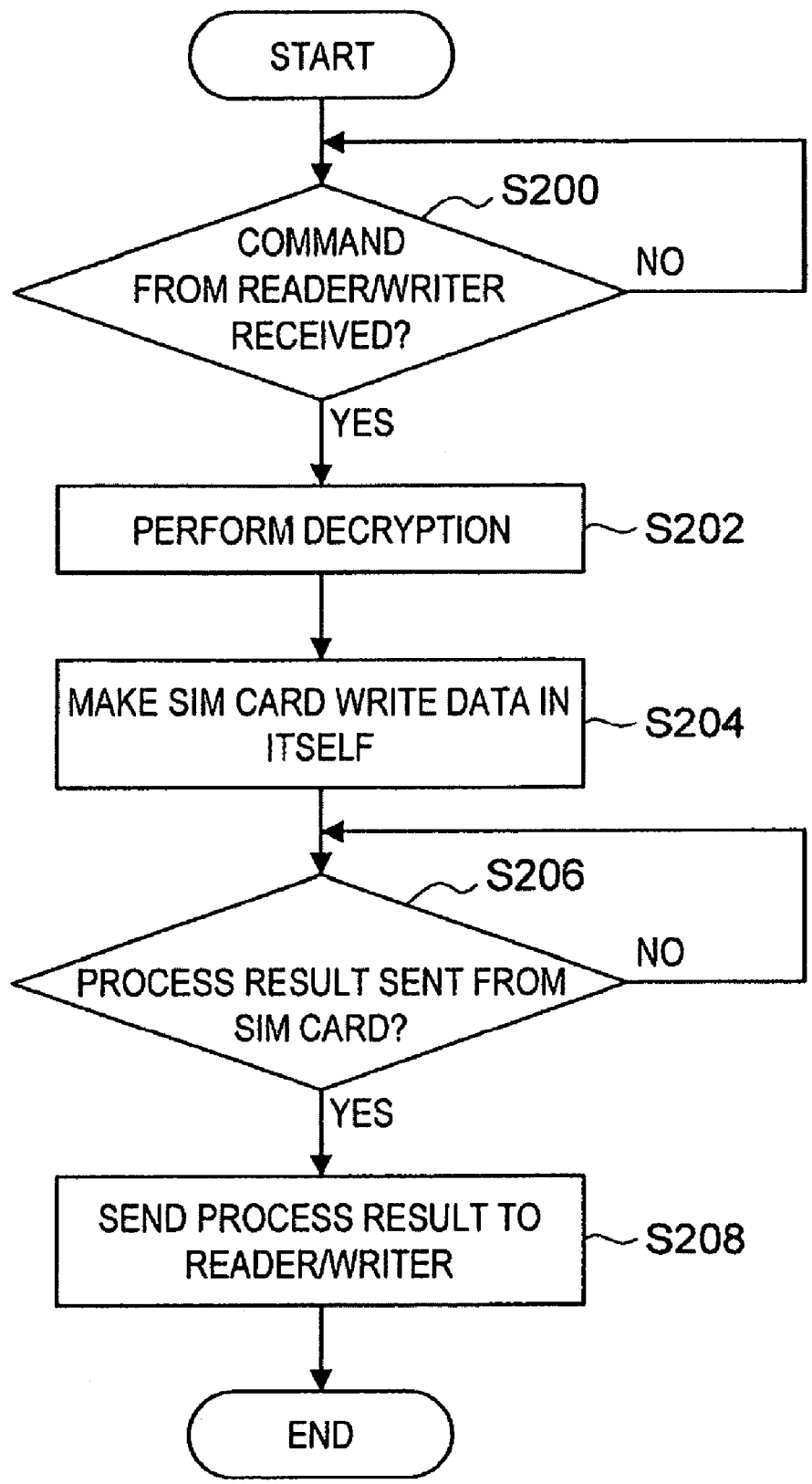
FIG. 6 is a flow chart showing an example of a method of writing data according to the second embodiment of the present invention.

Next, a method of writing data according to the second embodiment will be described. FIG. 6 is a flow chart showing an example of the method of writing data according to the second embodiment of the present invention.

The information processing apparatus 200 judges, similarly to the information processing apparatus 100 according to the first embodiment, whether or not a command is received from the reader/writer 10 (S200).

When it is not judged in step S200 that a command is received from the reader/writer 10, the information processing apparatus 200 does not proceed with the process until a command is received from the reader/writer 10.

Further, when it is judged in step S200 that a command is received from the reader/writer 10, similarly to the information processing apparatus 100 according to the first embodiment, the information processing apparatus 200 decrypts the command from the reader/writer 10 (S202). Incidentally, information to be decrypted in step S202 are not limited to the various commands such as a write command and a read command sent from the reader/writer 10 and can include data such as the service data. Further, the processes of steps S200 and S202 are performed by the IC chip 202 of the information processing apparatus 200, for example.

When decryption is performed in step S202, in response to a decrypted write command, the information processing apparatus 200 makes the SIM card 250 write in itself the decrypted data (S204). Here, the process of step S204 is performed by the control section 204 of the information processing apparatus 200 forwarding the decrypted data and write command to the SIM card 250, for example. Further, the control section 204 can also specify a memory address in which data is to be stored.

Incidentally, FIG. 6 shows an example where a write command and data to be written (service data) are sent from the reader/writer 10 and, in response to the write command and the data decrypted in step S204, the information processing apparatus 200 makes the SIM card 250 write the data in itself, but it is not limited to such. For example, when a read command for the service data is sent from the reader/writer 10, in response to the read command decrypted in step S204, the information processing apparatus 200 can make the SIM card 250 read the data from itself.

After making the SIM card 250 write the decrypted data in itself in step S204, the information processing apparatus 200 judges whether or not a process result is sent from the SIM card 250 (S206). Here, if a process result is not sent from the SIM card 250, the information processing apparatus 200 does not proceed with the process. Incidentally, if a process result is not sent from the SIM card 250 after a predetermined time, the information processing apparatus 200 can repeat the process of step S204 again or proceed to the next step.

When a process result is sent from the SIM card 250 in step S206, the information processing apparatus 200 sends the process result to the reader/writer 10 (S208). Here, the information processing apparatus 200 can perform the process of step S208 by the control section 204 making the IC chip 202 send the process result.

By using the method of writing data as shown in FIG. 6, the information processing apparatus 200 can make the SIM card 250 held in the SIM card holding section 106 store data in itself.

As described above, the information processing apparatus 200 according to the second embodiment of the present invention includes the IC chip 202 that communicates with the reader/writer 10, the SIM card holding section 106 that holds the SIM card 250 and the control section 204 that makes the SIM card 250 store in itself the service data demodulated by the IC chip 202. Here, the information processing apparatus 200 differs from the information processing apparatus 100 according to the first embodiment in that the control section 204 makes the SIM card 250 store in itself the data demodulated by the IC chip 202 (that is, writing of the data is performed by the SIM card 250). However, the SIM card 250 provided in the information processing apparatus 200 stores data such as the service data in the same manner as the SIM card 150 provided in the information processing apparatus 100. The SIM card 250 is an IC card that can be inserted into and removed from the information processing apparatus 200, and by inserting the SIM card 250 removed from the information processing apparatus 200 into another information processing apparatus, the SIM card 250 operates in the other information processing apparatus. Thus, by making a SIM card store the service data in itself, the information processing apparatus 200 can easily transfer the service data to another information processing apparatus.

Further, the control section 204 provided in the information processing apparatus 200 can make the SIM card 250 read the service data stored in the SIM card 250 and make it send the read service data to the IC chip 202. Accordingly, the information processing apparatus 200 can make the reader/writer 10 performing the service processing between itself and the IC chip 202 recognize the information processing apparatus 200 as an apparatus that performs the service processing in the same manner as the information processing apparatus of the related art having an IC chip.

(Modified Example of Information Processing Apparatus According to Second Embodiment)

Heretofore, as the information processing apparatus according to the second embodiment, a configuration has been described where, as shown in FIG. 5, the IC chip 202 which is configured by the antenna circuit for wireless communication 210 that communicates with the reader/writer 10 and the UART 220 is provided, for example. However, the information processing apparatus according to the second embodiment is not limited to a configuration where an IC chip is provided. For example, an information processing apparatus according to a modified example of the second embodiment can be provided with an antenna circuit for wireless communication not in the form of an IC chip. Even with the configuration as described above, the information processing apparatus according to the modified example of the second embodiment can communicate with the reader/writer 10 and demodulate data or command, and thus, a similar effect as that of the information processing apparatus 200 according to the second embodiment can be achieved.

Although the information processing apparatus 200 has been described as the second embodiment of the present invention, the embodiment of the present invention is not limited to such embodiment, and it may be applied to a portable communication device such as a mobile phone or a PHS or a computer such as a personal computer with a SIM card.

(Program According to Second Embodiment)

With a program which causes the information processing apparatus 200 according to the second embodiment to function as a computer, a SIM card can be made to store service data in itself.

(Third Embodiment)

For the information processing apparatuses according to the above described first and second embodiments, configurations are shown where IC chips provided in the information processing apparatuses communicate with a reader/writer and data relating to the communication is stored in SIM cards contained (or the SIM cards are made to store the data). However, the embodiment of the present invention is not limited to such, and the SIM card contained in the information processing apparatus can communicate with the reader/writer by itself and store data such as service data. Then, as the third embodiment, a configuration will be described next where the SIM card communicates with the reader/writer by itself.

Figure 7:
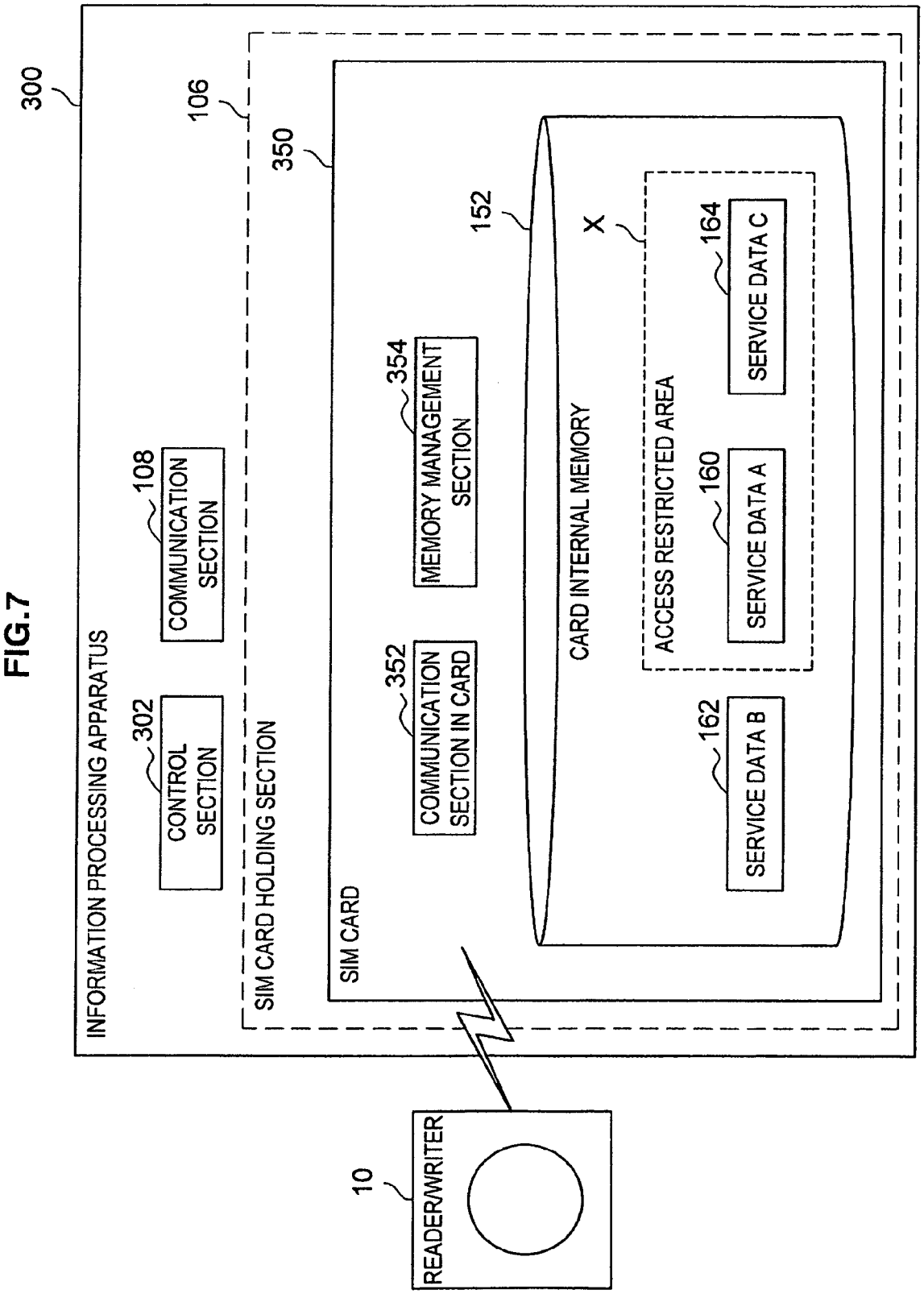
FIG. 7 is a block diagram showing an information processing apparatus according to a third embodiment of the present invention.

FIG. 7 is a block diagram showing an information processing apparatus 300 according to the third embodiment of the present invention. Referring to FIG. 7, the information processing apparatus 300 includes a control section 302, a SIM card holding section 106 and a communication section 108. Further, the information processing apparatus 300 may include a ROM (not shown) storing programs to be used by the control section 302 and data for control such as computational parameters, a RAM (not shown) temporarily storing programs and the like to be executed by the control section 302, an operation section (not shown) which can be operated by a user, a display section (not shown), a storage section (not shown) and the like.

The control section 302 is configured with an MPU, for example, and executes control programs stored in the ROM (not shown) and controls the entire information processing apparatus 300. Further, the control section 302 can realize various functions by executing applications stored in the storage section (not shown).

The SIM card holding section 106 and the communication section 108 can have the same configurations and functions as those of the information processing apparatus 100 according to the first embodiment as shown in FIG. 1.

Further, by including the SIM card holding section 106, the information processing apparatus 300 can contain a SIM card 350 within itself. In the following, the SIM card 350 will be described.

(SIM Card 350)

The SIM card 350 includes a card internal memory 152 capable of storing service data, a communication section in card 352 and a memory management section 354. Here, an IMSI (unique number) is added to the SIM card 350, similarly to the SIM card 150 according to the first embodiment as shown in FIG. 1, and the information processing apparatus 300 can uniquely identify the SIM card 350.

The card internal memory 152 can store service data similarly to the card internal memory 152 provided in the SIM card 150 according to the first embodiment as shown in FIG. 1. Further, the card internal memory 152 can include an access restricted area X. FIG. 7 shows an example where service data A 160, service data B 162 and service data C 164 are stored in the card internal memory 152, and among the data, the service data A 160 and the service data C 164 are stored in the access restricted area X.

The communication section in card 352 communicates with a reader/writer 10 in a non-contact manner by using a carrier, demodulates command and data sent from the reader/writer 10 and sends a response, for example. Note that, the communication section in card 352 can also communicate with the reader/writer 10 in a contact manner. In the following, a configuration will be described with an example where the communication section 352 in card communicates with the reader/writer 10 in a non-contact manner.

The memory management section 354 performs service processing based on the data or command demodulated by the communication section in card 352 and stores the processed data such as service data in the card internal memory 152. Further, the memory management section 354 can read the service data stored in the card internal memory 152, process the service data, and have the process result sent to the reader/writer 10 by using the communication section in card 352. Note that the processed service data can be included in the process result.

With the configuration as shown in FIG. 7, the SIM card 350 can communicate with the reader/writer 10 by itself and store data such as the service data in the card internal memory 152. Next, the hardware configuration of the SIM card 350 will be described.

(Hardware Configuration of SIM Card 350)

Figure 8:
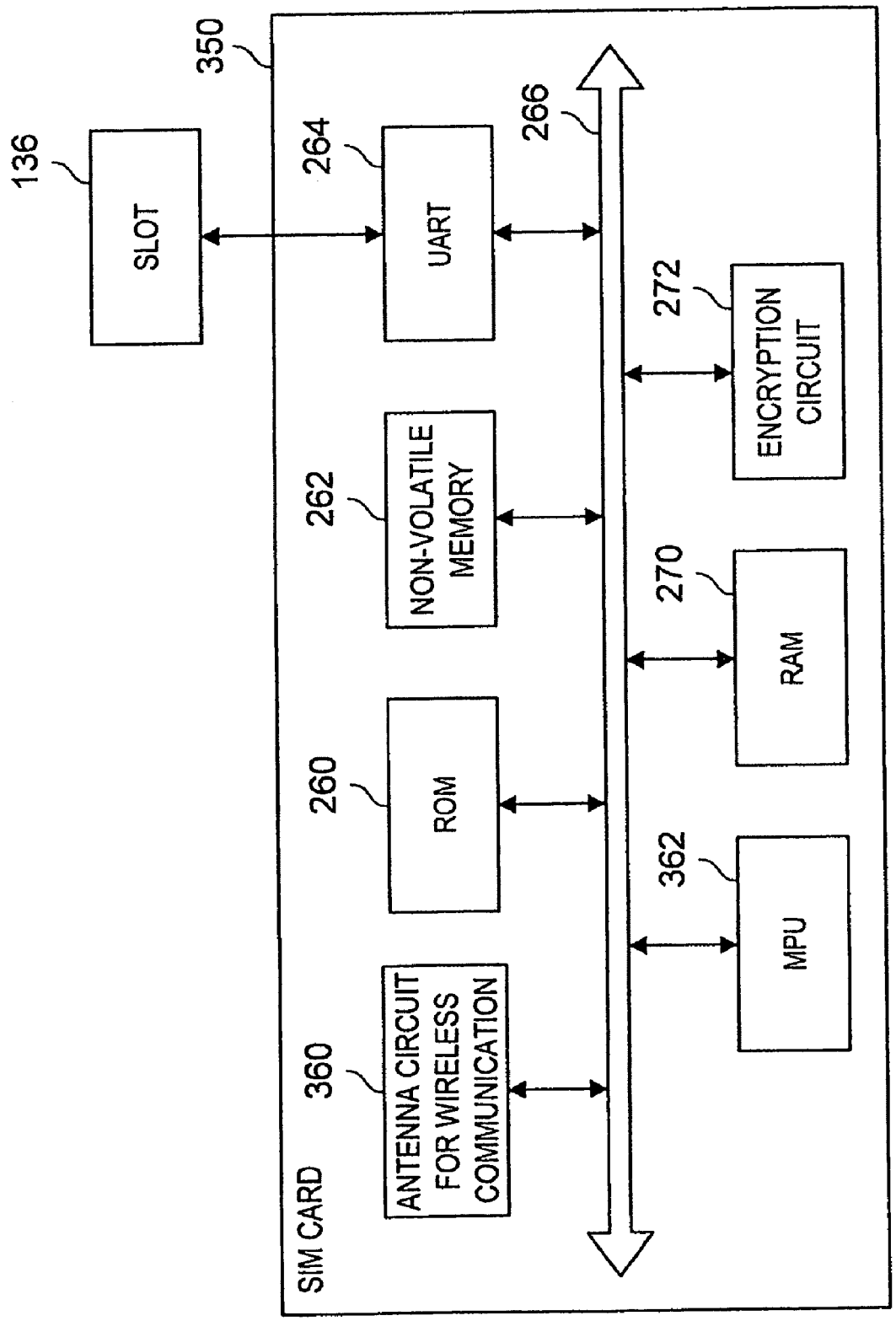
FIG. 8 is an explanatory diagram showing an example of the hardware configuration of a SIM card according to the third embodiment of the present invention.

FIG. 8 is an explanatory diagram showing an example of the hardware configuration of the SIM card 350 according to the third embodiment of the present invention.

Referring to FIG. 8, the SIM card 350 includes an antenna circuit for wireless communication 360, an MPU 362, a ROM 260, a non-volatile memory 262, a UART 264, a RAM 270 and an encryption circuit 272, and each component is connected with a card internal bus 266. Further, the SIM card 350 is connected with a slot 136 (SIM card holding section 106) of the information processing apparatus 300 via the UART 264.

The antenna circuit for wireless communication 360 is configured with, for example, a resonant circuit as a transmitting/receiving antenna having a coil with predetermined inductance and a capacitor with predetermined capacitance and a demodulator circuit, and receives a carrier sent from the reader/writer 10 and demodulates the various commands or service data. Further, the antenna circuit for wireless communication 360 includes a load modulation circuit and performs load modulation, for example, and communicates with the reader/writer 10 over the carrier by changing the impedance of the SIM card 350 to the reader/writer 10. Note that, in FIG. 8, a configuration is shown in which the antenna circuit for wireless communication 360 is provided within the SIM card 350. However, the configuration of the SIM card 350 according to the third embodiment of the present invention is not limited to such. For example, the SIM card 350 according to the third embodiment of the present invention can have the transmitting/receiving antenna provided outside the SIM card 350 or can have the transmitting/receiving antenna and the SIM card 350 provided in one package.

The MPU 362 performs the service processing in response to the various commands demodulated by the antenna circuit for wireless communication 360. Then, the MPU 362 makes the encryption circuit 272 encrypt the processed service data and stores the service data in the non-volatile memory 262. Incidentally, it is needless to say that the MPU 362 can store the processed service data in the non-volatile memory 262 without encrypting the service data.

The ROM 260 stores the IMSI which is a unique number for uniquely identifying the SIM card 350, programs to be used by the MPU 362 and data for control such as computational parameters. Further, the RAM 270 can temporarily store the programs to be executed by the MPU 362 and the like. Further, the encryption circuit 272 stores an encryption key, for example, and encrypts data such as the service data by using the encryption key.

As described above, the information processing apparatus 300 according to the third embodiment includes the SIM card holding section 106 and contains within itself the SIM card 350 that communicates with the reader/writer 10 and stores by itself data such as the service data. Here, the SIM card 350 is an IC card which can be inserted into and removed from the information processing apparatus 300, and by inserting the SIM card 350 removed from the information processing apparatus 300 into another information processing apparatus, the SIM card 350 operates in the other information processing apparatus. Accordingly, by containing within itself the SIM card 350 that communicates with the reader/writer 10 and stores by itself data such as the service data, the information processing apparatus 300 can easily transfer data to another information processing apparatus.

Further, since the SIM card 350 contained in the information processing apparatus 300 can communicate with the reader/writer 10, the information processing apparatus 300 can make the reader/writer 10 identify the information processing apparatus 300 as an apparatus that performs the service processing in the same manner as an information processing apparatus of a related art including an IC chip.

Although the information processing apparatus 300 has been described as the third embodiment of the present invention, the embodiment of the present invention is not limited to such embodiment, and it may be applied to a portable communication device such as a mobile phone or a PHS or a computer such as a personal computer with a SIM card.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
an integrated circuit (IC) chip configured to receive, by communicating with a reader/writer, service data corresponding to a service provided via the reader/writer and to process the received service data;

a subscriber identity module (SIM) card holding section configured to hold a SIM card that includes a card internal memory storing information and to which a unique number for identifying a subscriber is attributed; and a control section configured to store in the card internal memory of the SIM card the service data processed by the IC chip in the communication with the reader/writer, to read the processed service data stored in the card internal memory of the SIM card, and to make the IC chip process the received service data, wherein the SIM card is separate from the IC chip.

2. The information processing apparatus of claim 1, wherein the control section is further configured to cause the SIM card to store the processed service data in an access restricted area of the card internal memory of the SIM card.

3. The information processing apparatus of claim 2, wherein the IC card comprises an encryption circuit and the control section is further configured encrypt the processed service data by using the encryption circuit, and causing the SIM card to store the processed service data comprises causing the SIM card to store the encrypted processed service data in the access restricted area.

4. An information processing apparatus comprising:

an integrated circuit (IC) chip configured to receive from a reader/writer, by communicating with the reader/writer, service data corresponding to a service provided via the reader/writer;

a subscriber identity module (SIM) card holding section configured to hold a SIM card that includes a card internal memory storing information and to which a unique number for identifying a subscriber is added; and a control section configured to forward the service data received by the IC chip via the communication with the reader/writer to the SIM card held in the SIM card holding section, to make the SIM card process the received service data, to make the SIM card store the processed service data in the card internal memory of the SIM card, to read the processed service data stored in the card internal memory of the SIM card, and to make the IC chip send the processed service data, wherein the SIM card is separate from the IC chip.

5. The information processing apparatus of claim 4, wherein the control section is further configured to cause the SIM card to store the processed service data in an access restricted area of the card internal memory of the SIM card.

6. The information processing apparatus of claim 5, wherein the SIM card comprises an encryption circuit and the control section is further configured encrypt the processed service data by using the encryption circuit, and causing the SIM card to store the processed service data comprises causing the SIM card to store the encrypted processed service data in the access restricted area.

7. An information processing apparatus comprising:

a subscriber identity module (SIM) card holding section configured to hold a SIM card configured to receive from a reader/writer, by communicating with the reader/writer in a non-contact manner, service data corresponding to a service provided via the reader/writer, and to process the received service data, wherein the SIM card includes a card internal memory to store the processed service data and to which a unique number for identifying a subscriber is added; and a control section configured to make the SIM card store in the card internal memory of the SIM card the processed service data received and processed by the SIM card, to read the processed service data stored in the card internal memory of the SIM card, and to make the SIM card send the processed service data to the reader/writer, wherein the control section is further configured to cause the SIM card to store the processed service data in an access restricted area of the card internal memory of the SIM card.

8. The information processing apparatus of claim 7, wherein the SIM card comprises an encryption circuit and the control section is further configured to encrypt the processed service data by using the encryption circuit and causing the SIM card to store the processed service data comprises causing the SIM card to store the encrypted processed service data in the access restricted area.

9. An information processing method comprising:

processing, by communicating with a reader/writer in a non-contact manner, service data corresponding to a service provided;

storing the processed service data in a subscriber identity module (SIM) card that includes a card internal memory and to which a unique number for identifying a subscriber is added; and reading the service data stored in the card internal memory of the SIM card and sending the processed service data to the reader/writer, wherein reading the service data comprises reading the service data stored in an access restricted area of the card internal memory of the SIM card.

* * * * *